United States Patent [19]

d'Agostino et al.

[11] Patent Number: 5,413,143

[45] Date of Patent: May 9, 1995

[54] ROTARY VALVE ASSEMBLY

[75] Inventors: Guy d'Agostino, Vitry Sur Seine; Jean-Marie Brocard, Rubelles; Pierre G. J. Hebert, Libourne; Franck Liotte, Melun; Eric C. Lorne, Vaux Le Penil; Claude Maillard, Vulaines Sur Seine; Alain Tiepel, Chailly En Biere, all of France

[73] Assignee: Societe Nationale D'Etude et de Construction de Moteurs D'Aviation S.N.E.C.M.A., Paris, France

[21] Appl. No.: 190,554

[22] Filed: Feb. 2, 1994

Related U.S. Application Data

[62] Division of Ser. No. 1,744, Jan. 2, 1993, Pat. No. 5,307,838.

[30] Foreign Application Priority Data

Jan. 8, 1992 [FR] France .................. 92 00104

[51] Int. Cl.⁶ ............................................. F16K 11/074
[52] U.S. Cl. ............................. 137/625.11; 137/625.31
[58] Field of Search .................. 137/625.11, 625.31

[56] References Cited

U.S. PATENT DOCUMENTS

| | | | |
|---|---|---|---|
| 2,653,003 | 9/1953 | Overbeke | 137/625.21 |
| 2,675,830 | 4/1954 | Vuillemin | |
| 2,827,924 | 3/1958 | Towler et al. | |
| 2,925,095 | 2/1960 | Bates | |
| 3,008,490 | 11/1961 | Angelos | |
| 3,246,667 | 4/1966 | Pemberton | |
| 3,253,678 | 5/1966 | Osmond | |
| 3,687,163 | 8/1972 | Nickels | |
| 4,458,708 | 7/1984 | Leonard et al. | |
| 4,633,903 | 1/1987 | Simson | |

FOREIGN PATENT DOCUMENTS

| | | |
|---|---|---|
| 0102443 | 3/1984 | European Pat. Off. |
| 0512763 | 11/1992 | European Pat. Off. |
| 761690 | 11/1956 | United Kingdom |
| 2020339 | 11/1979 | United Kingdom |
| WO91/00462 | 1/1991 | WIPO |

Primary Examiner—Gerald A. Michalsky
Attorney, Agent, or Firm—Bacon & Thomas

[57] ABSTRACT

A rotary valve assembly is disclosed in which a rotary valve member is located within a casing having one or more fluid inlets and a plurality of fluid outlets. The rotary valve member has a fluid conduit which extends in a generally radial direction and which communicates with the fluid inlet. Fluid orifices communicate with the fluid conduit and exit through opposite sides of the rotary valve member to thereby minimize, or eliminate altogether, axial forces acting on the rotary valve member. Fluid outlet passages communicate with the two fluid orifices during at least part of the rotation of the rotary valve member to direct the pressurized fluid to the valve outlets. The rotary valve may include a pair of rotary valve members drivingly connected to each other such that they rotate synchronously. The connection may include gear teeth formed on the adjacent peripheries of the rotary valve members such that rotation of one of the valve members causes rotation of the other. Each valve member may have a separate fluid inlet and separate fluid outlets.

7 Claims, 6 Drawing Sheets

5,413,143

ROTARY VALVE ASSEMBLY

This application is a Division of application Ser. No. 08/001,744, filed Jan. 7, 1993, now U.S. Pat. No. 5,307,838.

BACKGROUND OF THE INVENTION

The present invention relates to a rotary valve assembly, more particularly such a rotary valve assembly having means to supply fluid to a plurality of fluidactuated devices.

Rotary valves having multiple outlets to supply pressurized fluid to one or more fluid-actuated devices are well known in the art. Typically such devices comprise one or more rotary valve members located in a sealed housing having at least one pressurized fluid inlet and one or more pressurized fluid outlets. Generally, the structure of the rotary valve member allows fluid to exit through only one side of the rotary member, thereby exerting axial forces on the rotary member.

SUMMARY OF THE INVENTION

A rotary valve assembly is disclosed in which a rotary valve member is located within a casing having one or more fluid inlets and a plurality of fluid outlets. The rotary valve member has a fluid conduit which extends in a generally radial direction and which communicates with the fluid inlet. Fluid orifices communicate with the fluid conduit and exit through opposite sides of the rotary valve member to thereby minimize, or eliminate altogether, axial forces acting on the rotary valve member. Fluid outlet passages communicate with the two fluid orifices during at least part of the rotation of the rotary valve member to direct the pressurized fluid to the valve outlets.

The rotary valve according to this invention may include a pair of rotary valve members drivingly connected to each other such that they rotate synchronously. The connection may include gear teeth formed on the adjacent peripheries of the rotary valve members such that rotation of one of the valve members causes rotation of the other. In this instance, each valve member may have a separate fluid inlet and separate fluid outlets.

Sealing members may contact opposite sides of the one or more rotary valve members to prevent fluid leakage. Spring devices may be associated with the sealing members in order to bias them into substantially sealing contact with opposite sides of the rotary valve members.

The one or more fluid conduits defined by each of the rotary valve members may extend generally radially outwardly from a central, rotational axis, or may extend radially inwardly from a periphery of the rotary valve member. In the first instance, the fluid inlet is substantially coaxial with the central, rotational axis, while in the latter instance, the fluid inlet may take place in a direction generally perpendicular to the rotational axis.

The fluid outlet passages may be defined by sleeves located in contact with opposite sides of each rotary valve member such that they communicate with the two fluid orifices during at least a portion of the rotation of the rotary valve member. Biasing devices may be associated with each of the sleeve members in order to bias them into substantially sealing contact with the opposite sides of the rotary valve member. In order to evenly distribute the biasing forces between all of the sleeves on a given side of the rotary valve member, a generally annular member may interconnect all of the sleeves on a given side of the rotary valve member.

The valve casing may define a portion of the fluid outlet passages such that corresponding passages on opposite sides of the rotary valve member are joined to a common passage which is connected to the valve outlet.

Since the two fluid orifices are located a fixed distance from the central, rotational axis of the rotary valve member, the outlet passages must also be located on a circle having this distance as a radius. Thus, as the rotary valve member rotates with respect to the case, the fluid orifices are brought into alignment with the outlet passages to enable pressurized fluid to pass through the rotary valve assembly. The rotary valve member may define more than one fluid conduits, although each fluid conduit will have two fluid orifices associated therewith such that these orifices exit on opposite sides of the rotary valve member.

The main advantage of the rotary valve assembly according to this invention is that the rotary valve member is balanced, which balancing of the forces acting on the rotary valve permits a valve assembly with reduced leakage.

DETAILED DESCRIPTION OF THE PREFERRED EMBODIMENTS

Figure 1:
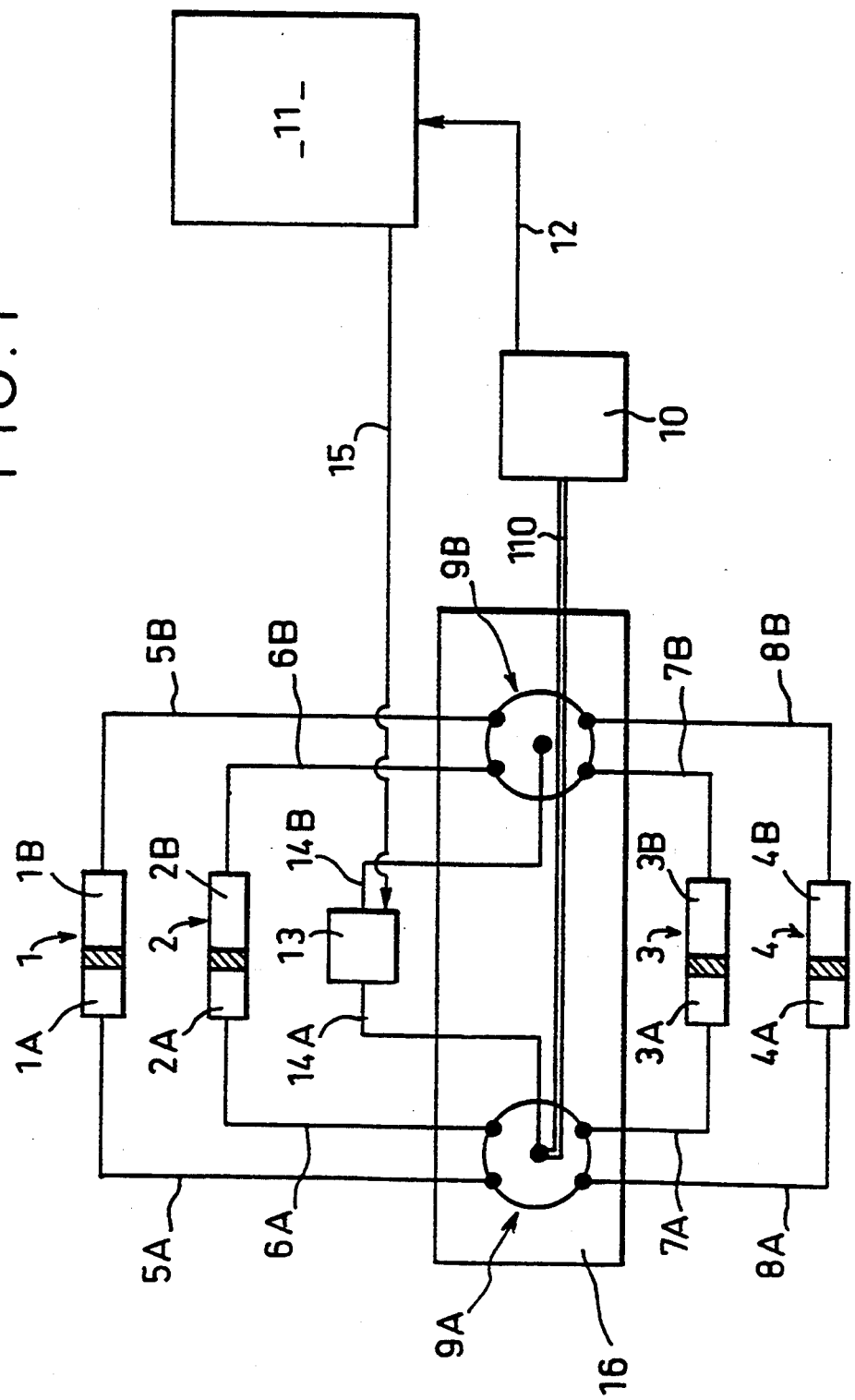
FIG. 1 is a schematic diagram of a hydraulic circuit incorporating a rotary valve according to the present invention wherein the rotary valve has two rotary valve members.

FIG. 1 schematically illustrates a hydraulic circuit comprising four hydraulically actuated jacks 1, 2, 3, 4, each of which has chambers on opposite sides of the pistons. The chambers are denoted 1A-1B, 2A-2B, 3A-3B, and 4A-4B. The chambers 1A, 2A, 3A and 4A are connected by hydraulic conduits 5A, 6A, 7A, 8A to four outlets of a first rotary valve 9A. Chambers 1B, 2B, 3B and 4B are, in turn, connected by conduits 5B, 6B, 7B and 8B to the four outlets of second rotary valve 9B. Rotary valves 9A and 9B are rotary fluid feed valves with synchronous rotation. The rotational speeds of the respective valves are detected and measured by sensor connections 110 connected to speed sensor 10. Speed sensor 10 has an outlet 12 which is operatively connected to calculator or computer 11.

A servo valve 13, which has two outlets is connected to a source of pressurized fluid (not shown) and is also connected to rotary valves 9A and 9B by conduits 14A and 14B, respectively in order to supply pressurized fluid to the rotary valves 9A and 9B. The operation of servo valve 13 is controlled by the calculator or computer 11 by control lead 15.

The two valves 9A and 9B are each multiple fluid valves which selectively supply pressurized fluid to the four hydraulic jacks 1-4 and may be located in a common case 16.

Figure 2:
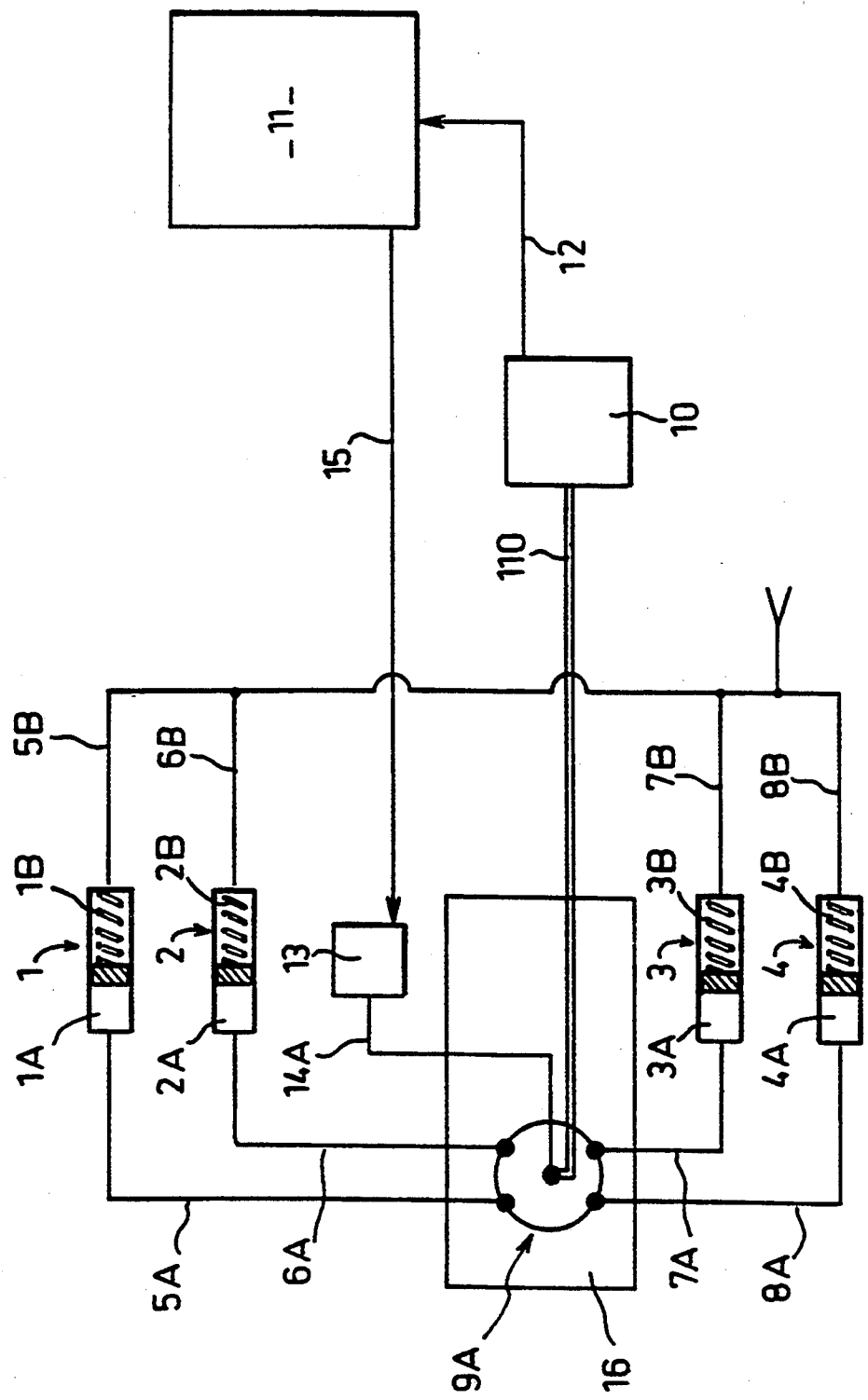
FIG. 2 is a schematic diagram of a hydraulic circuit similar to FIG. 1, but illustrating a valve according to the present invention having a single rotary valve member.

FIG. 2 illustrates a hydraulic circuit in which the four hydraulic jacks 1-4 are controlled by a single rotary valve 9A. In this instance, the hydraulic jacks 1-4 are single-action jacks and the jack chambers 1B, 2B, 3B and 4B each contain a piston return spring in known fashion. These chambers may be also connected to a constant pressure, or may be vented to ambient atmosphere via conduits 5B-8B. The components of the hydraulic circuit in FIG. 2 having the same identifying numerals as those elements in FIG. 1 have exactly the same function as in the circuit illustrated in FIG. 1.

Figure 3:
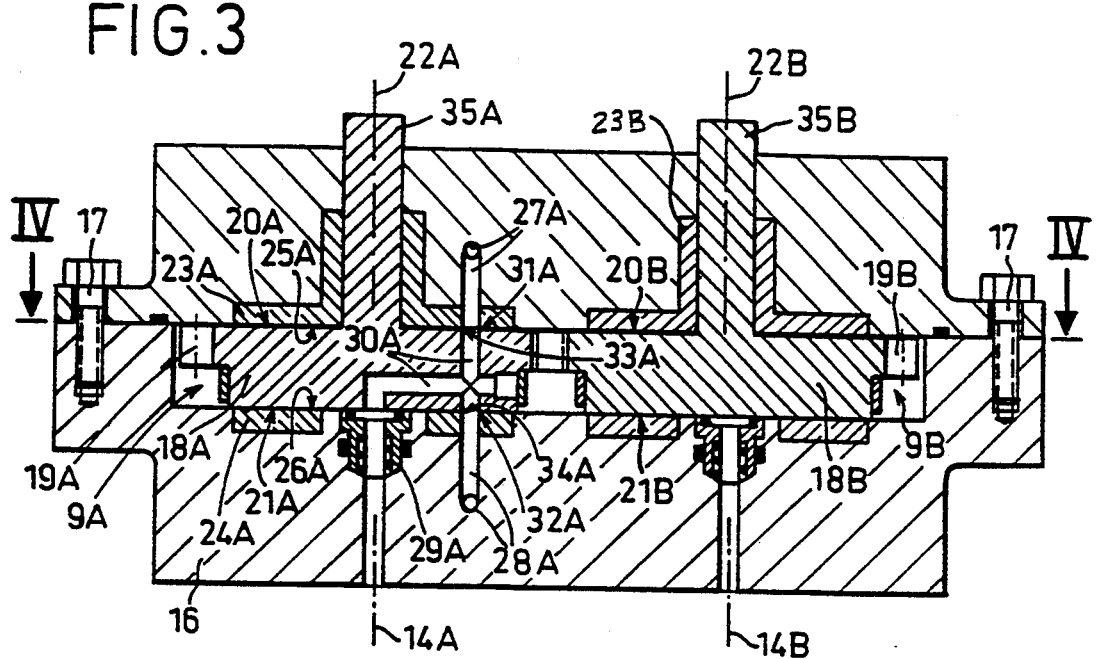
FIG. 3 is a cross-sectional view of a first embodiment of a rotary valve according to the present invention taken along line III—III in FIG. 4.
Figure 4:
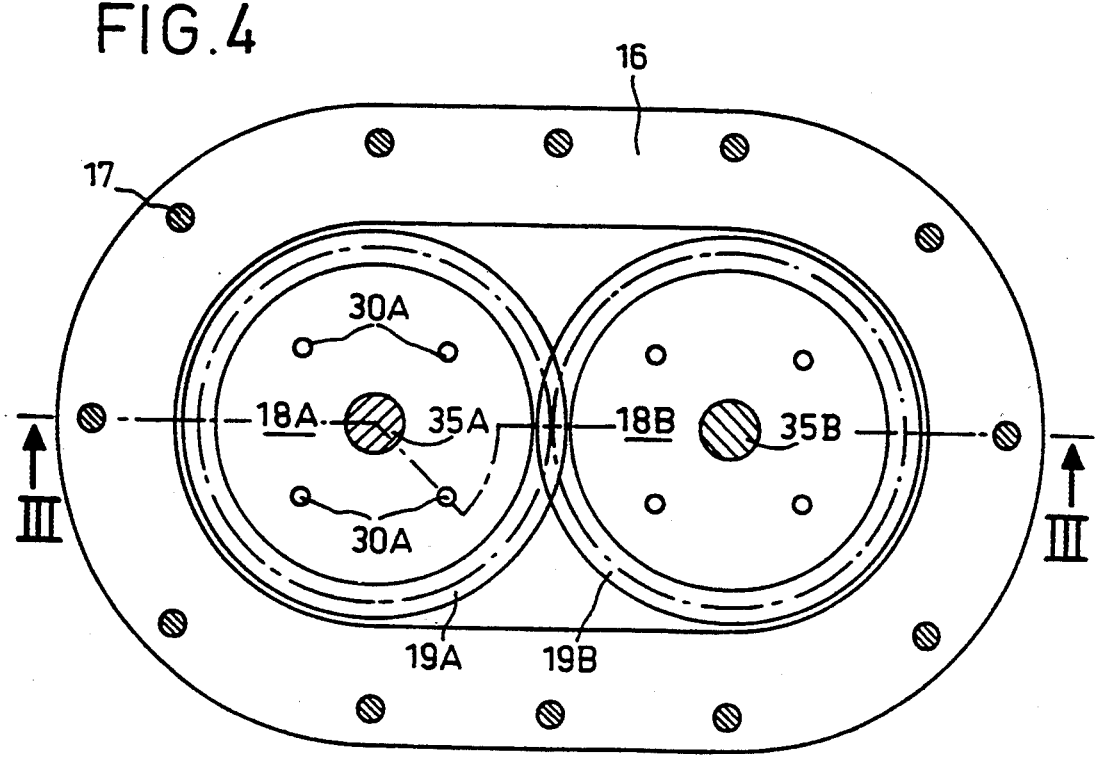
FIG. 4 is a cross-sectional view of the rotary valve according to the present invention taken along line IV—IV in FIG. 3.

FIGS. 3 and 4 illustrate a first embodiment of the rotary valve assembly according to the present invention. The case 16 may be comprised of two portions held in assembled relationship by a plurality of screws or bolts 17. The casing defines an interior chamber in which are mounted rotary valve elements 18A and 18B of generally circular configuration and having generally equal diameters. The peripheries of the rotary valve elements 18A and 18B define interengaging gear teeth 19A and 19B which mesh with each other so that the rotary valve members 18A and 18B may be rotated at equal speeds. Each rotary valve member defines opposite, generally planar sides 20A, 21A and 20B, 21B, respectively. The opposite sides extend generally perpendicular to the axes of rotation 22A and 22B of the rotary valve members. Seal members 23A and 24A define planar surfaces 25A and 26A which seal against the opposite surfaces 20A and 21A. Similarly, seal member 23B define planar surfaces 20B and 21B which seal against opposite sides of rotary valve member 18B.

As can be seen in FIG. 3, case 16 also defines fluid inlet passages 14A and 14B which are located generally coaxial with respect to the axes of rotation 22A and 22B, respectively. In this embodiment, the case 16 also defines outlet passages 27A and 28A. Although FIG. 3 illustrates only one of each of such passages, it is to be understood that the case 16 may define a plurality of such outlet passages for each of the respective rotary valve members 18A and 18B. The plurality of passages are, preferably, located on a circle extending around the respective axis 22A or 22B.

The inlet conduit 14A communicates with sleeve member 29A which defines an inlet passage generally coaxial with the rotational axis 22A. This passage further communicates with a fluid conduit 30A which is defined by the rotary valve member 18A which, in turn, communicates with fluid orifices 31A and 32A. As can be seen, the orifices 31A and 32A are located on opposite sides of the rotary valve members and are located on a circle extending around the rotational axis 22A such that they may be aligned with the outlet passages 27A and 28A, respectively. Although FIG. 3 illustrates only one such fluid conduit 30A and one pair of fluid orifices 31A and 32A, it is to be understood that each rotary valve member may define a plurality of fluid conduits, each of which has a pair of fluid orifices exiting through opposite sides of the rotary valve member. Accordingly, when the rotary valve member 18A rotates relative to the case 16, the fluid outlet orifices 33A and 34A of the outlet passages 27A and 28A, respectively, as well as the remaining outlet passages, consecutively communicate with the fluid orifices 31A and 32A.

The number of fluid conduits 30A defined by the rotary valve members may be equal to the number of fluid outlet passages on one side of the rotary valve member. In FIG. 4, four such outlet passages are illustrated on each side of the rotary valve member which may define four fluid conduits 30A. Thus, in the course of a complete rotation of the rotary valve member through 360°, it is possible to supply fluid to the outlet passages 27A and 28A, as well as the remaining passages, several times (in this particular instance four times).

The placement of fluid outlet orifices 31A and 32A, as well as outlet passage orifices 33A and 34A on opposite sides of the rotary valve member 18A balance the axial forces acting on the rotary valve member to thereby minimize, or eliminate altogether, any resultant axial force. The outlet passages 27A and 28A may be connected to each other, either within the casing 16, or external to the casing 16. The remaining pairs of outlet passages (one located on each side of the rotary valve member) may also be connected.

Sleeve 29A is biased into sealing contact with the side 21A of the rotary valve member 18A by a spring, or the like. Sleeve 29A may achieve the sealing contact by an O-ring bearing against the side 21A. The O-ring may be made of carbon or other material, depending upon the environment in which the valve assembly is to be utilized.

Each of the rotary valve members 18A and 18B may further comprise a shaft 35A and 35B extending exteriorly of the case 16 to be connected, in known fashion, with means to rotate the rotary valve member. It is to be understood that the structure of rotary valve member 18B in regard to the fluid conduits and the fluid orifices is exactly the same as that previously described in relation to rotary valve member 18A. Similarly, case 16 defines outer passages in conjunction with the rotary valve member 18B in exactly the same fashion as that previously described in relation to rotary valve member 18A.

Figure 5:
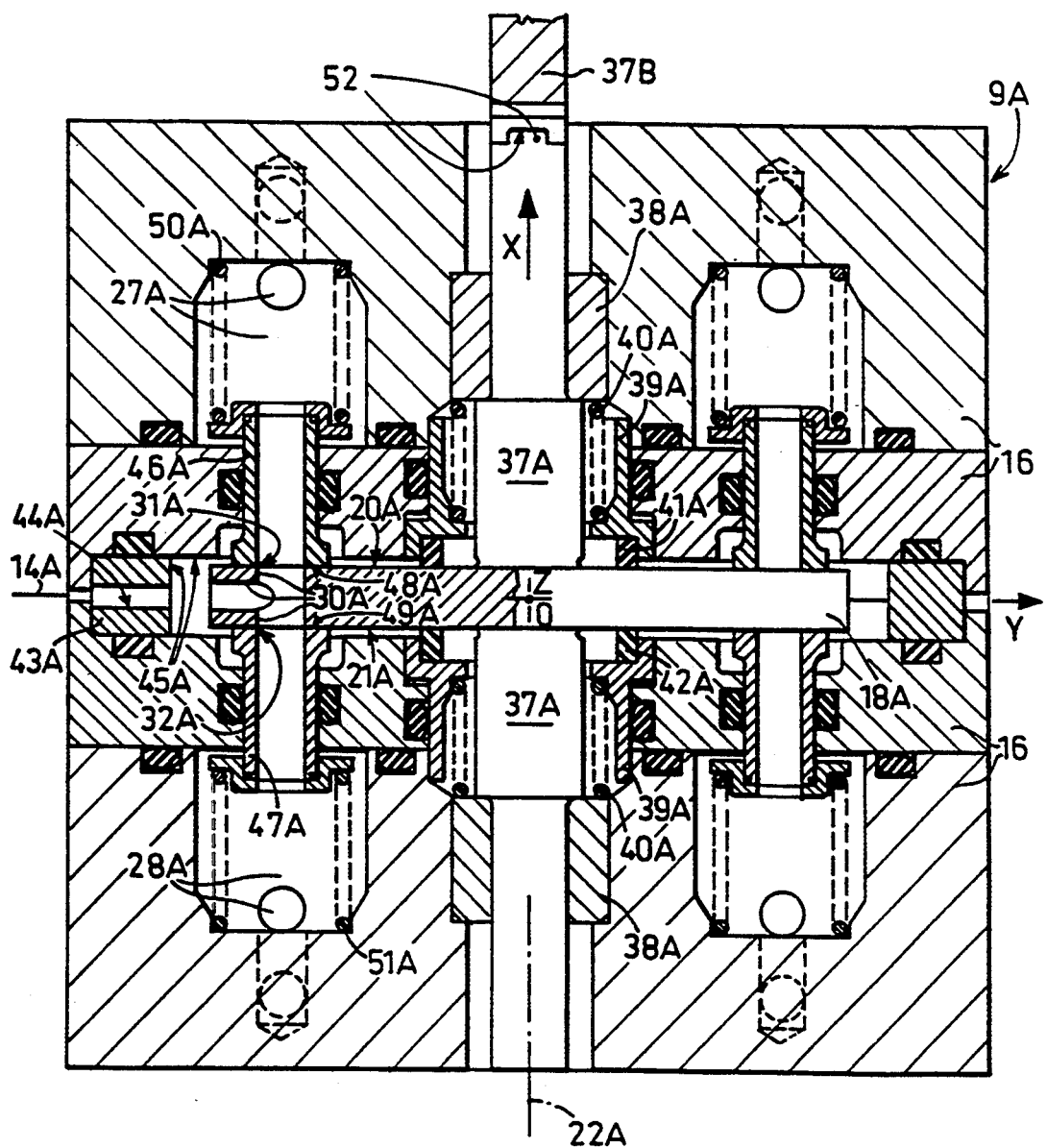
FIG. 5 is a cross-sectional view of a second embodiment of a rotary valve assembly according to the present invention.

A second embodiment of the rotary valve assembly according to this invention is illustrated in FIG. 5. In this figure, numerals identical to those utilized in FIG. 3 refer to elements having the same function as that in the previously described embodiment. In this embodiment, rotary valve member 18A has shafts 37A extending from opposite sides thereof, each shaft being rotatably supported in bearing 38A in the case 16. Sealing sleeves 39A extend around a portion of shafts 37A and seal against opposite sides of the rotary valve member 18A. Each of the sleeves 39A may have a seal element 41A, 42A which is biased against opposite sides 20A, 21A of the rotary valve member 18A by coil springs 40A interposed between the bearings 38A and the respective sleeve 39A. Such seal elements protect the bearings 38A from contact with the pressurized fluid passing through the valve assembly.

The case 16 is divided into opposite portions which are joined by a middle portion 43A which is equipped with a coupling 44A to which is connected the inlet conduit 14A. This allows inlet pressurized fluid to pass into the interior chamber defined by the case, which is in fluid communication with the fluid conduit 30A formed in the rotary valve member 18A. In this particular embodiment, the fluid conduits 30A extend radially inwardly from the periphery of the rotary valve member and are in fluid communication with fluid orifices 31A and 32A located on opposite sides of the rotary valve member 18A. In this particular embodiment, the interior chamber of the case takes the form of annular groove 45A.

Sleeve members 46A and 47A define generally planar surfaces 48A, 49A which sealingly bear against opposite sides 20A, 21A of the rotary valve member 18A. Coil springs 50A and 51A are operatively interposed between the case 16 and the respective sleeve members 46A and 47A in order to bias them into substantial sealing contact with the opposite sides of the rotary valve member. Sleeves 46A, 47A also define a portion of the outlet passages 27A and 28A and are located such that they are in alignment with the fluid orifices 31A, 32A exiting from opposite sides of the rotary valve member 18A.

The outlet passages 27A and 28A may also be joined together and connected to a common outlet, as are the remaining pairs of outlet passages in the same fashion as in the previously described embodiment. The connected pairs of outlet passages may be connected to outlets 5A–8A illustrated in FIG. 1. The groove 45A also supplies pressurized fluids to the other fluid conduits 30A. The circle of the centers of orifices 31A, 32A is the same size as the circle of the centers of sleeves 46A, 47A and their counterparts to allow communication between the fluid orifices and the passages defined by the sleeves during at least a portion of the rotation of the rotary valve member 18A.

If a plurality of rotary valve members are to be utilized, they can be interconnected by inter-engaging drive elements 52 formed in shafts 37A and 3713 which is connected to the second rotary valve member (not shown). It is to be understood that the structure of the second rotary valve assembly is exactly the same as that previously described.

Figure 6:
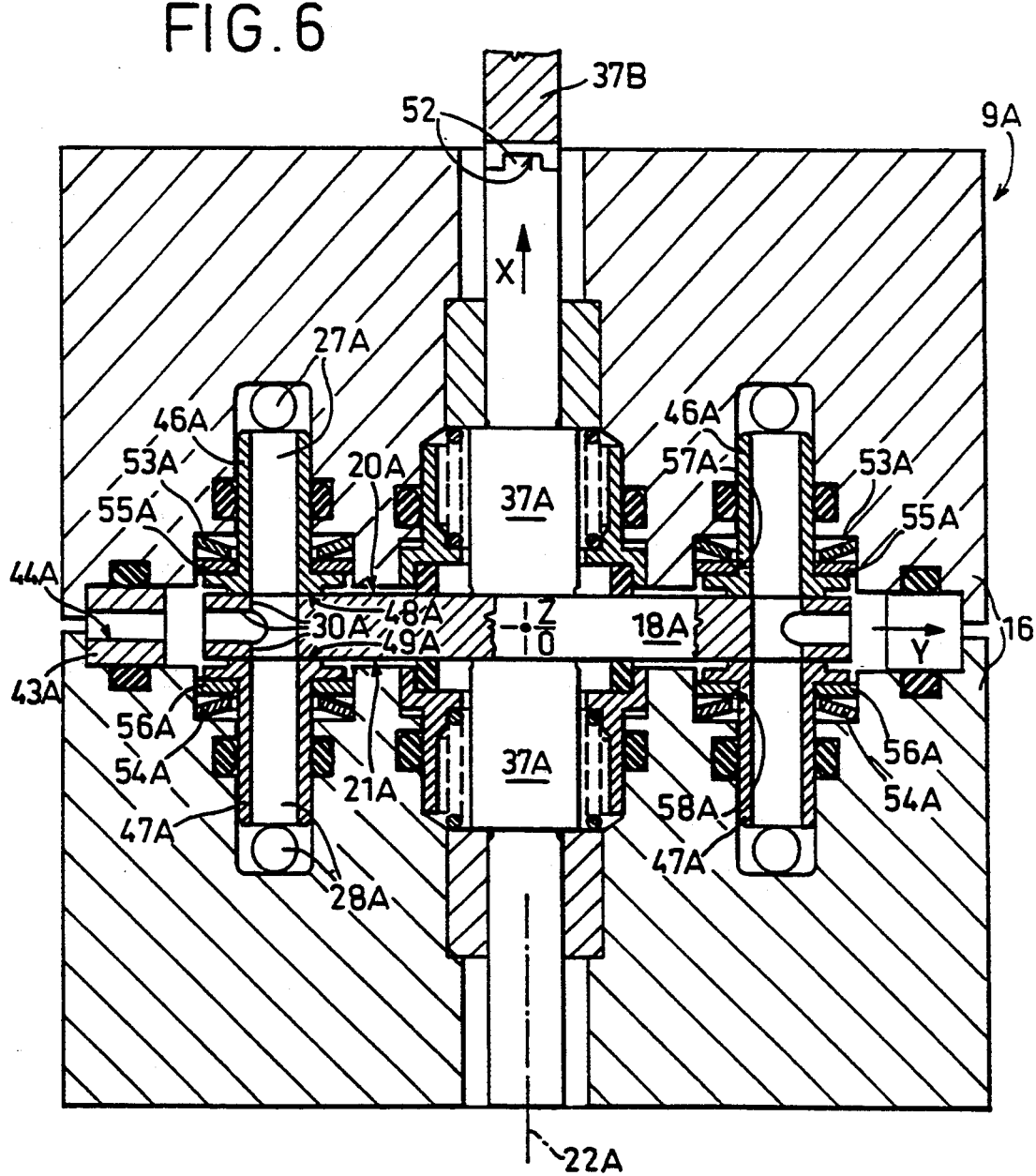
FIG. 6 is a cross-sectional view of a third embodiment of a rotary valve assembly according to the present invention.
Figure 7:
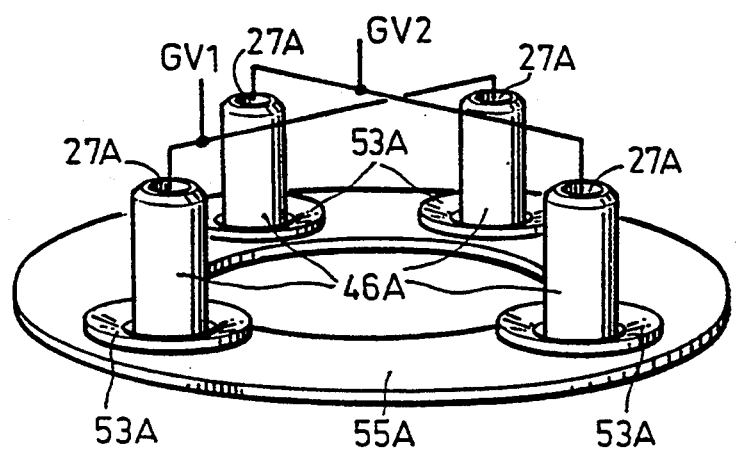
FIG. 7 is a partial, perspective view illustrating the sealing force distribution ring used in the rotary valve assembly of FIG. 6.

A third embodiment of the rotary valve member according to the present invention is illustrated in FIGS. 6 and 7 and is similar to the previously described embodiment illustrated in FIG. 5. However, in this embodiment, spring washers 53A, 54A are utilized to bias the surfaces 48A, 49A of sleeve members 46A, 47A into substantial sealing contact with the opposite surfaces 20A, 21A of the rotary valve member 18A. The spring washers 53A, 54A replace the compression springs 50A, 51A of the embodiment illustrated in FIG. 5. In order to equalize the forces of the spring washers 53A, 54A a first generally annular member 55A is operatively interposed between each of the spring washers 53A and its respective sleeve member 46A and a similar, generally annular member 56A is operatively interposed between the spring washers 54A and the respective sleeve members 47A. This is schematically illustrated in FIG. 7 wherein four sleeve members 46A and four spring washers 53A are interconnected by generally annular member 55A. The annular members 55A, 56A ensure uniform distribution of the forces of spring washers 53A, 54A on each side of the rotary valve member 18. This avoids any imbalance of forces acting on the rotary valve member 18A and allows each of the sleeve members 46A, 47A to achieve a satisfactory seal against opposite sides of the rotary valve member.

Figure 8:
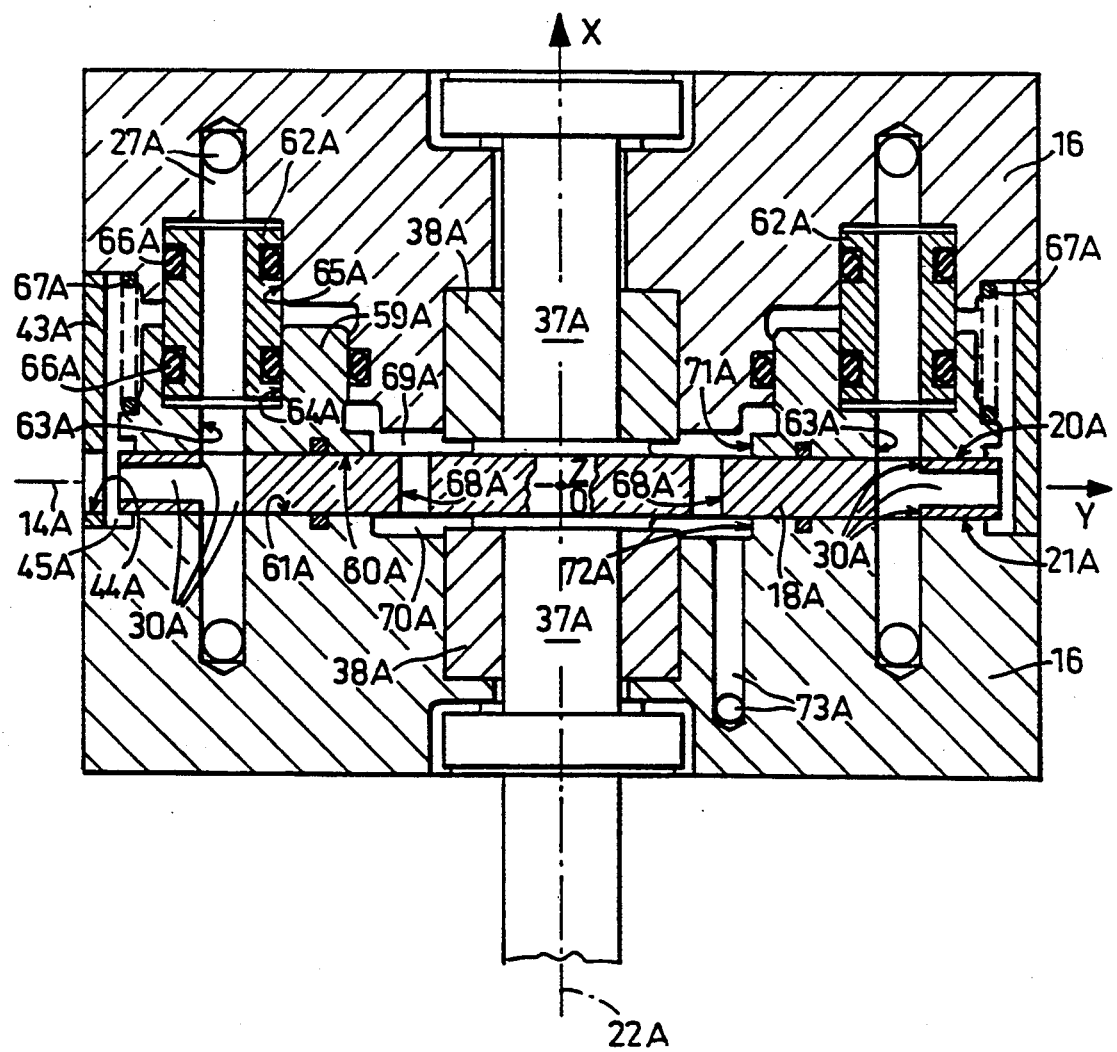
FIG. 8 is a cross-sectional view of a fourth embodiment of the rotary valve assembly according to the present invention.

A fourth embodiment of the rotary valve member according to the present invention is illustrated in FIG. 8. Again, elements having the same numerals as those in previously described embodiments perform the same function as those in previous embodiments. Rotary valve member 18A is rotatably supported on integral shafts 37A extending from opposite sides, by bearings 38A attached to case 16. Rotary valve member 18A defines fluid conduits 30A which extend radially inwardly from a periphery of the valve member. Again, each of the plurality of fluid conduits 30A are in fluid communication with fluid orifices exiting through opposite sides 20A, 21A of the rotary valve member. Fluid conduits 30A each communicate with the interior chamber defined by the case 16, in this particular instance, taking the shape of groove 45A.

A middle member 43A extends between portions of the case 16 and defines a coupling 44A which may be connected to the fluid inlet 14A by known means.

In this embodiment, a generally annular sealing member 59A defines a generally planar surface 60A which is in sealing contact with the surface 20A of the rotary valve member 18A. The opposite side 21A of the rotary valve member 18A is in sealing contact with a generally planar surface 61A formed as part of the case 16. Planar surfaces 60A and 61A extend generally perpendicular to the central axis of rotation 22A. The sealing member 59A defines a plurality of fluid outlets 63A spaced from the central axis of rotation 22A a distance substantially equal to that of the fluid orifices exiting through opposite sides of the rotary valve member 18A. Thus, during at least a portion of the rotation of the rotatable valve member 18A, the outlet passages 63A are in fluid communication with the fluid orifices of the rotary valve member.

Sleeve members 62A, which define a portion of the fluid outlet passages, extend between the sealing member 59A and the portion of the case 16 defining outlet passages 27A. Sleeve members 62A may extend into cavities 64A, 65A defined by the sealing member 59A and the case 16, respectively. O-ring seal members 66A may be operatively disposed between the sleeve members 62A, and both the case 16 and the sealing member 59A.

A spring 67A is located between a portion of the case 16 and the sealing member 59A in order to bias the generally planar surface 60A of the sealing member 59A into substantially sealing contact with the surface 20A of the rotary valve member 18A. Such force also biases the opposite side 21A of the rotary valve member 18A into sealing contact with the generally planar surface 61A of the case 16.

Any fluid leakage between surfaces 60A, 20A and between surfaces 61A and 21A can be eliminated by providing holes 68A which extend through the rotary valve member 18A such that the holes communicate with central cavities 69A and 70A. Cavity 69A is bounded by the inner rim 71A of the sealing member 59A, while central cavity 70A is bounded by rim 72A formed on the case 16. Conduit 73A communicates with the central cavity 70A to remove any leaking fluid which accumulates in these cavities. Conduit 73A may be connected to an unpressurized fluid collector in known fashion.

Each of the previously described embodiments allows the periodic feeding of pressurized fluid to the motive chambers of the hydraulic devices, such as chambers 1A–4A through conduits 5A–8A and to exhaust fluid from the hydraulic actuated devices via conduits 5B–8B using a single multiple valve assembly with two synchronously rotating valve members 9A and 9B. It is to be understood, however, that in some instances, the use of a single rotary valve member may prove satisfactory.

The grouping of pairs of outlet passages on opposite sides of the rotary valve member permit balancing of the axial forces acting on the rotary valve members (acting generally along the O-X axis parallel to the axis of rotation 22A).

As illustrated in FIG. 6, the pairs of outlet passages 27A, 28A on opposite sides of the rotary valve members may be connected thereby providing good balancing of the forces on the O-X axis parallel to the axis of rotation 22A. As illustrated in FIG. 7, substantially diametrically opposite outlet passages 27A may be interconnected to provide fluid outlets GV1 and GV2 in order to balance the forces acting generally parallel to the O-Z axis, which extends generally perpendicular to the X-O-Y plane illustrated in FIG. 6. Such connection of the outlet passages entails doubling of the sleeves 46A, 47A as well as the accessories associated therewith. This design is applicable to the embodiments illustrated in FIGS. 5, 6 and 8.

In several of the described embodiments, the opposite surfaces 20A, 21A of the rotary valve member 18A engage floating or movable elements which are movable with respect to the case 16 to thereby automatically allow positioning of the rotary valve member and allow it to operate with very low, or zero, leakage.

The foregoing description is provided for illustrative purposes only and should not be construed as in any way limiting this invention, the scope of which is defined solely by the appended claims.

We claim:

1. A rotary valve assembly comprising:
   a) a casing defining an interior chamber, the casing comprising;
      i) two separate opposite portions; and
      ii) a middle portion joining the two separate opposite portions together;
   b) a rotary valve member operatively associated with the casing such that the valve member may rotate within the interior chamber, the rotary valve member having opposite sides and defining at least one fluid conduit, and at least two fluid orifices, one fluid orifice opening on each opposite side of the rotary valve member such that the at least two fluid orifices are in fluid communication with the at least one fluid conduit;
   c) a shaft extending from each opposite side of the rotary valve member, each shaft being rotatably supported by a bearing in the casing;
   d) a sealing sleeve extending around a portion of each shaft and in sealing contact with the rotary valve member;
   e) inlet means defining a fluid inlet in fluid communication with the at least one fluid conduit, wherein the inlet means comprises;
      i) a first fluid inlet passage; and,
      ii) a second fluid inlet passage in fluid communication with the first fluid inlet passage and the at least one fluid conduit wherein the second fluid inlet passage is generally perpendicular to an axis of rotation of the rotary valve member;
   f) outlet means defining at least two fluid outlet passages, one passage located on each opposite side of the rotary valve member and located such that the at least two fluid outlet passages are in fluid communication with the at least two fluid orifices during at least a portion of rotation of the rotary valve member wherein the outlet means comprises:
      i) at least two first fluid outlet passages defined by the housing, one outlet passage located on each of the opposite sides of the rotary valve member; and,
      ii) at least two outlet sleeve members, each defining a second fluid outlet passage and located on opposite sides of the rotary valve member such that each second fluid outlet passage is in fluid communication with a first fluid outlet passage, whereby the at least two first fluid outlet passages are grouped in pairs, the fluid outlet passages of each pair are connected to each other.

2. The rotary valve assembly of claim 1 further comprising biasing means operatively associated with the at least two outlet sleeve members so as to bias the at least two outlet sleeve members into substantially sealing contact with the rotary valve member.

3. The rotary valve assembly of claim 2 wherein the biasing means comprises a coil spring.

4. The rotary valve assembly of claim 2 wherein the biasing means comprises a spring washer.

5. The rotary valve assembly of claim 4 a generally annular member operatively interposed between all outlet sleeve members on a same side of the rotary valve member and the spring washers.

6. The rotary valve assembly of claim 1 further comprising fluid sealing means operatively interposed between the at least two outlet sleeve members and the casing.

7. The rotary valve assembly of claim 1 wherein the fluid conduit extends generally radially inwardly from a periphery of the rotary valve member.

* * * * *